(12) United States Patent
Watanabe et al.

(10) Patent No.: US 9,001,209 B2
(45) Date of Patent: Apr. 7, 2015

(54) MONITORING APPARATUS

(75) Inventors: Kazuya Watanabe, Anjo (JP); Noboru Nagamine, Anjo (JP)

(73) Assignee: Aisin Seiki Kabushiki Kaisha, Aichi (JP)

( * ) Notice: Subject to any disclaimer, the term of this patent is extended or adjusted under 35 U.S.C. 154(b) by 750 days.

(21) Appl. No.: 13/265,669

(22) PCT Filed: Feb. 19, 2010

(86) PCT No.: PCT/JP2010/052526
§ 371 (c)(1),
(2), (4) Date: Oct. 21, 2011

(87) PCT Pub. No.: WO2010/134366
PCT Pub. Date: Nov. 25, 2010

(65) Prior Publication Data
US 2012/0033080 A1  Feb. 9, 2012

(30) Foreign Application Priority Data
May 20, 2009 (JP) ................................ 2009-122131

(51) Int. Cl.
*H04N 7/18* (2006.01)
*H04N 5/232* (2006.01)
*B60R 1/00* (2006.01)
(52) U.S. Cl.
CPC .............. *H04N 5/23293* (2013.01); *B60R 1/00* (2013.01); *B60R 2300/30* (2013.01); *B60R 2300/8053* (2013.01)
(58) Field of Classification Search
USPC ................................. 348/143, 148
See application file for complete search history.

(56) References Cited

U.S. PATENT DOCUMENTS

| | | | |
|---|---|---|---|
| 6,853,806 B2 | 2/2005 | Nakata et al. | |
| 6,931,208 B2 | 8/2005 | Nakata et al. | |
| 7,092,625 B2 | 8/2006 | Nonaka | |
| 2003/0035507 A1* | 2/2003 | Hsu et al. ........................ | 378/4 |
| 2003/0202108 A1* | 10/2003 | Maeda ....................... | 348/216.1 |

(Continued)

FOREIGN PATENT DOCUMENTS

| | | |
|---|---|---|
| CN | 1499823 A | 5/2004 |
| JP | 9-9142 A | 1/1997 |
| JP | 09009142 A * | 1/1997 |

(Continued)

OTHER PUBLICATIONS

Office Action issued in corresponding Chinese Office Action No. 2010800219979 dated Sep. 10, 2013.

(Continued)

*Primary Examiner* — Sath V Perungavoor
*Assistant Examiner* — Jeffery Williams
(74) *Attorney, Agent, or Firm* — Sughrue Mion, PLLC (57) ABSTRACT

Disclosed is a monitoring technique for displaying a low-luminance image of e.g. a dark area in an easily visible manner. The inventive apparatus includes an image capturing unit 10 for capturing an image of an object to be monitored, an inversion condition determining unit 11 for determining whether an inversion condition is satisfied or not based on the visibility of the image captured by the image capturing unit 10, and a display image generating unit 12 for generating a negative/positive inverted image from the captured image when it is determined by the inversion condition determining unit 11 that the inversion condition is satisfied.

9 Claims, 7 Drawing Sheets

(56) References Cited

U.S. PATENT DOCUMENTS

2007/0040661 A1* 2/2007 Takemura et al. ............ 340/461
2008/0194946 A1* 8/2008 Summers et al. ............ 600/425

FOREIGN PATENT DOCUMENTS

| | | |
|---|---|---|
| JP | 11-146389 A | 5/1999 |
| JP | 11-243538 A | 9/1999 |
| JP | 2001-359108 A | 12/2001 |
| JP | 2003-324748 A | 11/2003 |
| JP | 2005-303442 A | 10/2005 |
| JP | 2005303442 A * | 10/2005 |
| JP | 2006074710 A * | 3/2006 |
| JP | 2008-201202 A | 9/2008 |
| JP | 2008-230464 A | 10/2008 |

OTHER PUBLICATIONS

Extended European Search Report dated Aug. 7, 2012 issued in corresponding European Patent Application No. 10777602.3.
International Search Report for PCT/JP2010/052526, dated Apr. 27, 2010.
Written Opinion for PCT/JP2010/052526, dated Apr. 27, 2010.
English Translation of International Preliminary Report on Patentability for PCT/JP2010/052526 dated Dec. 22, 2011.

* cited by examiner

MONITORING APPARATUS

CROSS REFERENCE TO RELATED APPLICATIONS

This application is a National Stage of International Application No. PCT/JP2010/052526, filed on Feb. 19, 2010, which claims priority from Japanese Patent Application No. 2009-122131, filed on May 20, 2009, the contents of all of which are incorporated herein by reference in their entirety.

TECHNICAL FIELD

The present invention relates to a monitoring technique, more particularly to a monitoring technique for displaying an image captured from a dark area.

BACKGROUND ART

Conventionally, various studies have been made for a monitoring technique for displaying an image capturing a dark area. For instance, there is known a television camera including an image capturing lens, image capturing (pick-up) devices having sensitivity ranging from the near infrared light to the visible light, an IR (infrared) cut filter for eliminating wavelength components in the near IR range, and a video image signal processing means for generating black and white signals and color signals according to video signals from the image capturing devices (see Patent Document 1). This television camera includes also a filter exchanger means. With this filter exchanger means, if the photographic object has a luminance lower than a predetermined luminance, the IR cut filter is exchanged by a dummy glass (blank glass) to generate black and white video signals. On the other hand, if the photographic object has a luminance higher than the predetermined luminance, the dummy glass is exchanged by the IR cut filter to generate color video signals. Further, with this television camera, during the period of determination of filter exchange, a still image before the filter exchange is outputted to a monitor or the like.

According to this technique of Patent Document 1, when the photographic object has low luminance, its image is captured without using the IR cut filter, so a black and white video image is outputted. On the other hand, if the photographic object has high luminance, its image is captured with using the IR cut filter, so that a color video image is outputted. With this arrangement, with for a dark object, an image having as high as possible luminance can be obtained.

Further, as another technique, there is known an automatic exposure apparatus for a car-mounted camera to be mounted on an automobile vehicle having a variable beam projection type headlight configured to maintain the illumination by the headlight to the traveling direction of the vehicle (see Patent Document 2). This automatic exposure apparatus for a car-mounted camera includes a car-mounted camera for capturing an image of a predetermined area around the vehicle body, a photometric area setting means for setting a photometric area in such a manner that an image of the used area for a image captured by the car-mounted camera may be an image captured under appropriate exposure, a steering angle/illumination direction information obtaining means for obtaining at least one of information about a steering angle of the steering wheel and information about the illumination direction of the beam of the headlight, and an illumination area captured image estimating means. This illumination area captured image estimating means, based on the information obtained by the steering angle/illumination direction information obtaining means, estimates an occupying area, within the image capturing area of the car-mounted camera, of an illumination area image capturing area, which is an area for use in capturing the image of the area illuminated by the beam of the headlight, the estimation including presence/absence of the illumination area image capturing area within the image capturing area of the car-mounted camera. The photometric area setting means is cable of varying the photometric area according to change in the result of estimation by the illumination area captured image estimating means.

With this technique of Patent Document 2, an appropriate exposure adjustment is realized by varying the photometric area for use in the exposure adjustment according to the illumination area of the headlight.

As still another technique, there is known a side monitoring camera system for an automobile, including an image capturing means for capturing an image of at least a side (lateral) area of the front portion of the vehicle, a light mounted to the vehicle and capable of illuminating at least the side area of the vehicle front portion, and a controlling means for controlling the illumination condition of the light according to the image capturing state of the image capturing means (see Patent Document 3). With this technique of Patent Document 3, as the image capturing area is illuminated by the light, a bright image can be captured.

PRIOR ART DOCUMENTS

Patent Documents

[Patent Document 1] Japanese Unexamined Patent Application Publication No. 2003-324748

[Patent Document 2] Japanese Unexamined Patent Application Publication No. 2008-230464 (paragraphs 0023, 0024)

[Patent Document 3] Japanese Unexamined Patent Application Publication No. 2008-201202 (paragraphs 0005, 0006)

SUMMARY OF THE INVENTION

Object To Be Achieved by Invention

With the above-described techniques, the luminance or the like of the captured image can be enhanced by varying the image capturing environment at the time of image capturing of a low-luminance range. However, with the techniques of Patent Document 1 and Patent Document 3, there are required the mechanism for moving the IR cut filter or the additional light (illumination). As such, these techniques result in greater complexity of the apparatus as well as cost increase, disadvantageously.

Further, with the technique of Patent Document 2, although the photometric area can be set appropriately, exposure adjustment alone will not suffice to secure satisfactory effect in case the captured image as a whole suffers low luminance.

In view of the above-described states of the art, the object of the present invention is to provide a monitoring technique for displaying a low-luminance image obtained from a dark area or the like in an easily visible manner.

Means for Achieving Object

For achieving the above-noted object, a monitoring apparatus according to the present invention, comprises:

an image capturing unit for capturing an image of an object to be monitored;

an inversion condition determining unit for determining whether an inversion condition is satisfied or not, based on the visibility of the image captured by the image capturing unit; and a display image generating unit for generating a negative/positive inverted image from the captured image when it is determined by the inversion condition determining unit that the inversion condition is satisfied.

With the above-described arrangement, the inversion condition determining unit determines the inversion condition based on the visibility of the captured image. And, when it is determined that the inversion condition is satisfied, the display image generating unit generates a negative/positive inverted image from the captured image. This inversion condition is for determination of poorness of the visibility, such as a low luminance of the captured image as a whole, which is the case with e.g. a captured image obtained by capturing an image of low-luminance. Therefore, even in the case of a captured image generally having low luminance and poor visibility, as a negative/positive inverted image is generated from this captured image, an image having generally high luminance can be obtained. In the sensitivity adjustment of human eyes, light adaptation occurs more speedily than dark adaptation and the focus adjustment of crystalline lens too provides better response in the case of bright index. Therefore, the negative/positive inversion of a low luminance image is desirable also from the viewpoint of human engineering. Further, when a color image is negative/positive inverted, the resultant image has colors significantly differing from the real colors. Therefore, in case the captured image is a color image, it is preferred that the negative/positive inverted image be provided a grayscale image for the purpose of reducing the unnaturalness also.

Many cameras have the AGC (Auto Gain Control) function. This AGC function is provided for obtaining an image of appropriate luminance by increasing the gain in the case of a dark photographic object. Accordingly, the gain value calculated by the AGC function appropriately reflects the luminance value of the captured image. For this reason, according to one preferred embodiment of the present invention, the apparatus further comprises an exposure controlling unit for effecting exposure control of the image capturing unit by controlling a gain value, and the inversion condition determining unit determines the inversion condition based on the gain value. With this arrangement, by utilizing the gain value as a criterion of the visibility, it can be appropriately determined whether the captured image is to be negative/positive inverted or not.

In the case of capturing an image of a dark photographic object, as the gain is increased, the effect of noise on the captured image increases correspondingly. Then, if such captured image suffering from significant noise influence is negative/positive inverted, the resultant image will suffer from conspicuous noises, thus unpleasant-looking. For this reason, according to one preferred embodiment of the present invention, the inversion condition determining unit determines that the inversion condition is satisfied if the gain value exceeds a predetermined gain value which is smaller than the maximum gain value. With this arrangement, the threshold value for as the determination condition for the negative/positive inversion is set as a value smaller than the maximum gain value. Preferably, this threshold value is set as a gain value which does not lead to significant noise influence. In this case, the captured image suffers only small noise influence thereto, hence, its negative/positive inverted image too will have good visibility.

Further, many cameras have the function of controlling the exposure condition by varying the shutter speed. With this function in operation, for a dark photographic object, the shutter speed is decreased so as to introduce a greater amount of light so that the luminance of the captured image can be enhanced. Therefore, it may be said that the shutter speed is indicative of the luminance value of the captured image. For this reason, according to one preferred embodiment of the monitoring apparatus relating to the present invention, the apparatus further comprises an exposure controlling unit for effecting exposure control of the image capturing unit by controlling a shutter speed of the image capturing unit, and the inversion condition determining unit determines the inversion condition based on the shutter speed. With this arrangement, by utilizing the shutter speed as a criterion of the visibility, it can be appropriately determined whether the captured image is to be negative/positive inverted or not.

According to one preferred embodiment of the present invention, the inversion condition determining unit determines the inversion condition based on a pixel value of the captured image. With this arrangement, since the pixel value of the captured image is used as a criterion of the visibility, the inversion condition can be determined more appropriately.

The monitoring apparatus of the present invention is configured to effect the monitoring by visual checking of a display image displayed on a monitor. The display for displaying the display image has various displaying characteristics. For this reason, when the negative/positive inverted image is displayed, there is the possibility of blank white spots ("over") and black shadow spots ("under") being formed therein. For this reason, according to one preferred embodiment of the present invention, the display image generating unit offsets the pixel value according to the displaying characteristics or the like of the display in the negative/positive inversion. With this arrangement, by offsetting the pixel value according to the displaying characteristics or the like of the display when a negative/positive inversion is effected, an even more easily visible negative/positive inverted image can be generated.

If an illumination by artificial lighting is available in the photographic area in the case of night photographing or image capturing, the captured image may sometimes contain a high-luminance value area and a low-luminance value area in a mixed state. If such captured image is subject to uniform negative/positive inversion based on the determination result of the inversion condition, the luminance value of the originally high luminance value area will be lowered, thus rendering the image not easily visible. For this reason, according to one preferred embodiment of the present invention, the display image generating unit is configured to effect the negative/positive inversion of only a limited portion of the captured image. With this arrangement, subsequent to satisfaction of the inversion condition, determination is made to distinguish within the captured image, between an area to be negative/positive inverted and an area not to be negative/positive inverted; and a negative/positive inversion is effected only on the area to be negative/positive inverted. With this, a display image having appropriate luminance value can be obtained.

The inventive monitoring apparatus can be mounted on a vehicle. With such monitoring apparatus, preferably, the image capturing unit is disposed to capture an image of surrounding of the vehicle. Especially, the vehicle in general is not equipped with a light for illuminating the lateral vicinity of the vehicle body so that the luminance value of the captured image captured from the lateral vicinity area of the vehicle body tends to be low, which makes the monitoring of the lateral vicinity area by the captured image difficult. For this reason, preferably, the image capturing unit is disposed in such a manner to capture an image of the lateral vicinity area of the vehicle body. With this, even in the case of a low luminance image captured from the lateral vicinity area of the vehicle body, as this image is displayed after its negative/positive inversion, the monitoring may be made easy.

With a monitoring apparatus, there is often employed an image capturing unit capable of capturing a color image. Then, if a negative/positive inversion is effected on a color image captured by such image capturing unit, the image may have colors widely different from the real colors, so that there is the possibility of the image giving feeling of oddness or unnaturalness. For this reason, according to one preferred embodiment of the present invention, the image capturing unit captures the captured image as a color image and the display image generating unit generates, as said negative/positive inverted image, a grayscale image produced by effecting the negative/positive inversion and a monochromatic conversion on said captured image. With this arrangement, the negative/positive inverted image is generated by effecting a negative/positive inversion and a monochromatic conversion on a captured image which is a color image. That is, with this arrangement, the negative/positive inverted image is provided as a monochromatic image, so that the feeling of oddness or unnaturalness can be reduced advantageously.

Effect of Invention

With the present invention, even if the luminance of a captured image is low, an image having appropriate luminance is displayed, so that monitoring of dark area too can be effected appropriately.

MODE OF EMBODYING THE INVENTION

Figure 1:
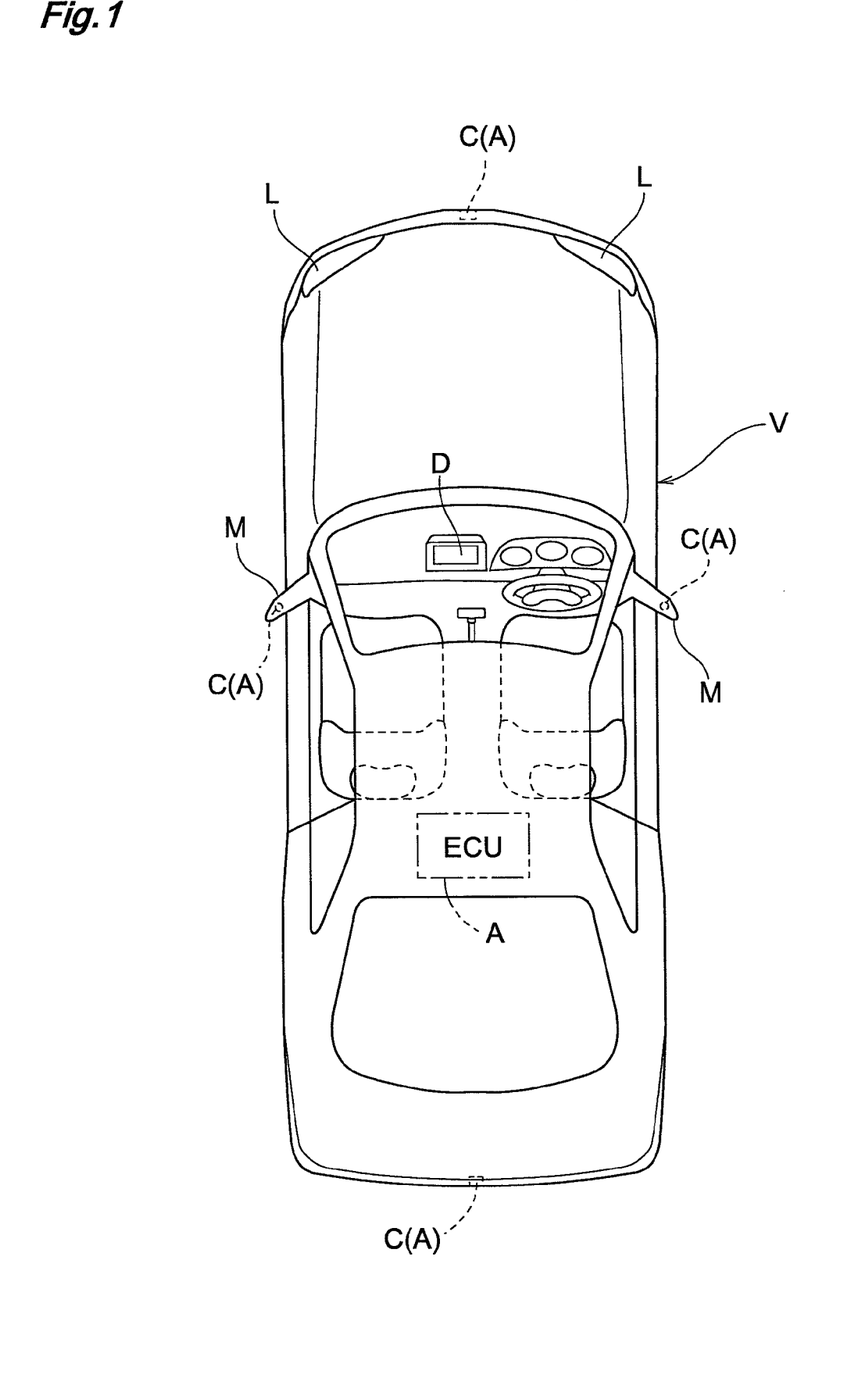
[FIG. 1] is a view showing a vehicle mounting a monitoring apparatus according to the present invention.

Next, embodiments of a monitoring apparatus relating to the present invention will be described with reference to the accompanying drawings. As shown in FIG. 1, a monitoring apparatus A is mounted on a vehicle V and the apparatus consists essentially of camera(s) C and an ECU (Electronic Control Unit). As shown also in FIG. 1, the cameras C are disposed respectively at positions where images of the front side, rear side and the right and left lateral sides of the vehicle V can be captured thereby. However, the disposing positions of the cameras C are not limited to those described above, but the cameras C can be disposed at any other appropriate positions. Also, the number of cameras C is not limited to one, but the number can be varied as desired. In the following discussion of the instant embodiment, the cameras C will be described as color digital video cameras. However, instead of them, digital still cameras can be employed also. Further, the vehicle V mounts a display D for displaying e.g. a display image generated by the monitoring apparatus A. In case the vehicle V mounts a navigation system, a display unit of such navigation system will preferably be used also as the display D.

[Embodiment 1]

Figure 2:
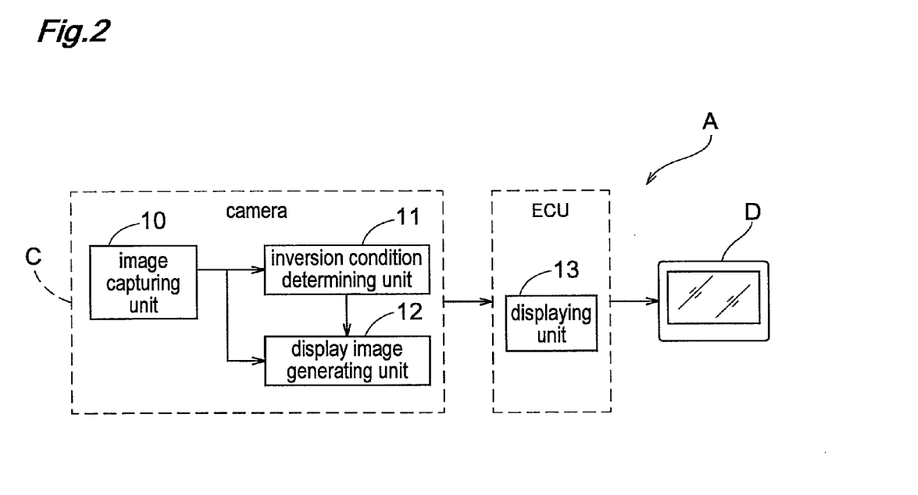
[FIG. 2] is a functional block diagram of Embodiment 1 of the inventive monitoring apparatus.

FIG. 2 is a functional block diagram of the monitoring apparatus A of this embodiment. The monitoring apparatus A of this embodiment includes an image capturing unit 10 for capturing an image of the surrounding of the vehicle V, an inversion condition determining unit 11 for determining a condition ("inversion condition" hereinafter) of whether to effect a negative/positive inversion or not on a captured image captured by the image capturing unit 10, a display image generating unit 12 for generating a negative/positive inverted image from the captured image in case the inversion condition determining unit 11 has determined that the inversion condition is satisfied and a displaying unit 13 for causing a display D to display a display image generated by the display image generating unit 12.

The image capturing unit 10 is comprised of an image sensor such as a CCD (Charged Coupled Device) sensor or a CMOS (Complementary Metal Oxide Semiconductor) sensor of the camera C, an image sensor driver and an A/D converter etc. as its principal components. Light incident on the lens of the camera C is subject to a photoelectric conversion by the image sensor and then subject to an A/D conversion by the A/D converter etc. to produce a captured image. The captured image thus produced is stored in a RAM incorporated within a DSP (Digital Signal Processor) and the event (occurrence) of production of a captured image is sent to the inversion condition determining unit 11 and the display image generating unit 12.

The inversion condition determining unit 11 is comprised of the DSP of the camera C and this unit 11 determines whether to effect a negative/positive inversion of the captured image or not, based on a luminance value of the captured image (this will be detailed later herein).

The display image generating unit 12 is comprised also of the DSP of the camera C and this unit 12 generates a display image from the captured image, based upon result of the determination by the inversion condition determining unit 11. The display image generating unit 12 generates, as a display image, a negative/positive inverted image from the captured image, if the inversion condition determining unit 11 has determined that the inversion condition is satisfied. Incidentally, the "negative/positive inverted image" refers to an image obtained by effecting at least a negative/positive inversion process on the captured image. In the instant embodiment, however, monochromatic conversion is also effected for the greater visibility of the image. This monochromatic conversion can be effected either before or after the negative/positive inversion. On the other hand, if it is determined that the inversion condition is not satisfied, the captured image is treated as it is as the display image. Incidentally, the display image generating unit 12 can include an additional function such as a function of resolution conversion. The display image generated by the display image generating unit 12 is sent to the displaying unit 13.

The displaying unit 13 is comprised of the ECU and a software both mounted on the vehicle V and this unit 13 has the function of displaying the display image generated by the display image generating unit 12 on the display D.

Figure 3:
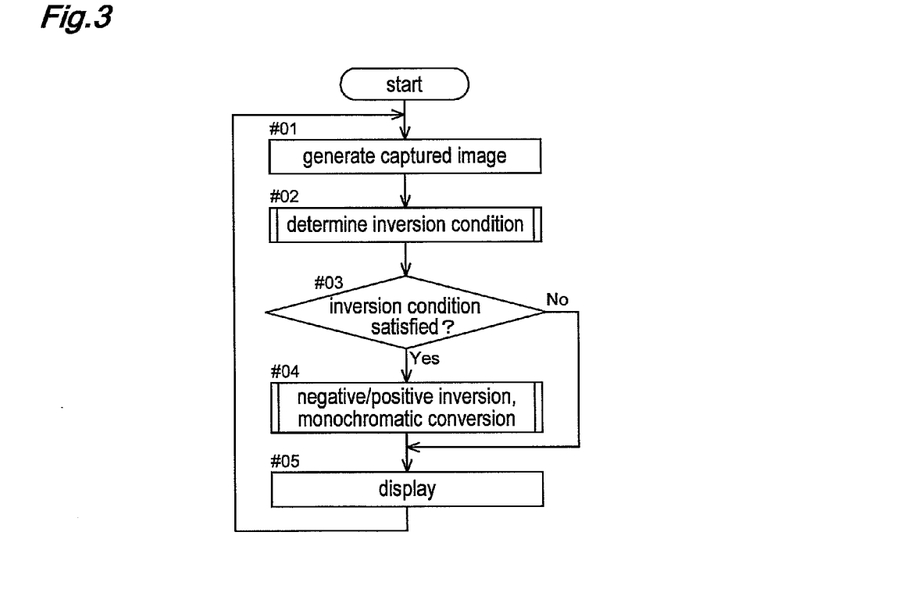
[FIG. 3] is a flowchart illustrating a flow of a process in Embodiment 1 of the inventive monitoring apparatus.

FIG. 3 is a flowchart illustrating a process of the operations in the monitoring apparatus A of this embodiment. Firstly, the image capturing unit 10 is driven at a predetermined frame rate (e.g. 30 fps) to generate a captured image (#01). The generated captured image is stored in the RAM of the camera C and this event is reported to the inversion condition determining unit 11. Further, the captured image is sent to the display image generating unit 12.

Figure 4:
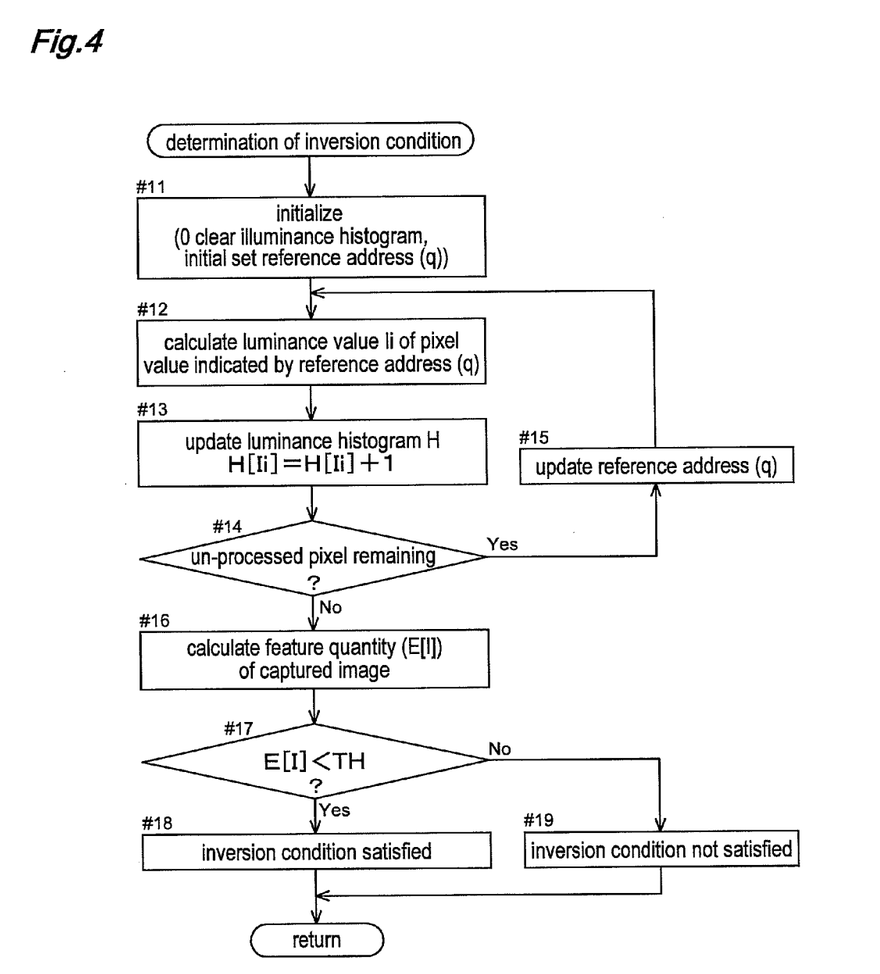
[FIG. 4] is a flowchart illustrating a flow of a process in an inversion condition determination in Embodiment 1 of the inventive monitoring apparatus.

Upon receipt of the report of the event of captured image production from the image capturing unit 10, the inversion condition determining unit 11 determines whether a predetermined inversion condition is satisfied or not (#02). Specifically, in the instant embodiment, the process shown by the flowchart of FIG. 4 is effected.

Firstly, as an initialization process, all elements of a luminance histogram are initialized by "0" and at a reference address (q), an initial address of the captured image in the RAM is set (#11). The luminance histogram is realized as an array having the same number of elements as the number of gradations of the luminance value (in the following case, 256 gradations of from 0 to 255). In the following discussion, it is assumed that H [k] represents the frequency of the luminance value (k).

Next, based on a pixel value of the i-th pixel (pi) of the captured image represented by the reference address (q), a luminance value (Ii) of the pixel (pi) is calculated (#12). As described above, in the instant embodiment, a color digital video camera is employed as the camera C. Therefore, a captured image is a color image. In general, a color image has pixel values consisting of three values of the red (R) component, green (G) component and blue (B) component. Therefore, the pixel value of the pixel (pi) is represented as [Ri, Gi, Bi]. Here, the luminance value (Ii) of the pixel (pi) can be obtained by Ii=0.299×Ri+0.587×Gi+0.114×Bi. Needless to say, any other calculation formula can be used for the mathematical calculation of the luminance value (Ii).

Next, based on the luminance value (Ii) obtained by the above process, the luminance histogram (H) is updated (#13). Specifically, a calculation: H[Ii]=H[Ii]+1 is effected.

Thereafter, presence/absence of any unprocessed pixel(s) is checked (#14). Specifically, it is determined whether the reference address (q) has reached the final address of the captured image in the RAM or not. In the case of presence of un-processed pixel(s) (YES branching at #14), in order to shift the process to the next unprocessed pixel, the reference address (q) is incremented (#15) and then the process goes onto the process at #12, to repeat the above-described procedure. Incidentally, in the instant embodiment, the luminance histogram (H) was produced with using all of the pixels of the captured image. Instead, only some of the pixels of the captured image may be used for its production. Namely, the arrangement in such case is to employ a predetermined area (an area of interest) in the captured image.

On the other hand, in the case of absence of unprocessed pixel (NO branching at #14), with using the luminance histogram (H) produced by the above-described process, a "feature quantity" of the captured image is calculated (#16). Some non-limiting examples of a feature quantity of the captured image that can be calculated from the luminance histogram (H) are average luminance, luminance distribution, shape (single-peak, double-peak, etc.) of the luminance histogram, etc. In the following discussion of the instant embodiment, an average luminance is employed. Therefore, the inversion condition determining unit 11 calculates an average luminance E [I] as the feature quantity of the captured image with using Formula (1) below. Incidentally, in the instant embodiment, it is assumed that the captured image is represented in the respective colors (RGB) 8 bits.

$$E[I] = \sum_{k=0}^{255} (H[k] \times k) \Big/ \sum_{k=0}^{255} H[k] \qquad (1)$$

The inversion condition determining unit 11 compares the average luminance E [I] thus calculated with a predetermined threshold value TH (#17) and if the average luminance E [I] is smaller than the threshold value TH (YES branching at #17), it is determined that the inversion condition is satisfied (#18). On the other hand, if the average luminance E [I] is greater than the threshold value TH (NO branching at #17), it is determined that the inversion condition is not satisfied (#19). This determination result of the inversion condition determining unit 11 is reported to the display image generating unit 12.

Upon receipt of the determination result of the inversion condition determining unit 11, the display image generating unit 12 generates a display from the captured image, based on this determination result. In this, the captured image obtained from the image capturing unit 10 is currently stored in the RAM within the DSP. Specifically, if the report shows the determination of non satisfaction of the inversion condition (NO branching at #03), the display image generating unit 12 directly (as it is) sends the captured image obtained from the image capturing unit 10 as a display image to the displaying unit 13. On the other hand, if the report shows the determination of satisfaction of the inversion condition (YES branching at #03), the display image generating unit 12 effects a negative/positive inversion and a monochromatic conversion on this captured image (#04). Incidentally, in case a monochromatic camera is employed as the camera C, no monochromatic conversion will be needed.

Figure 5:
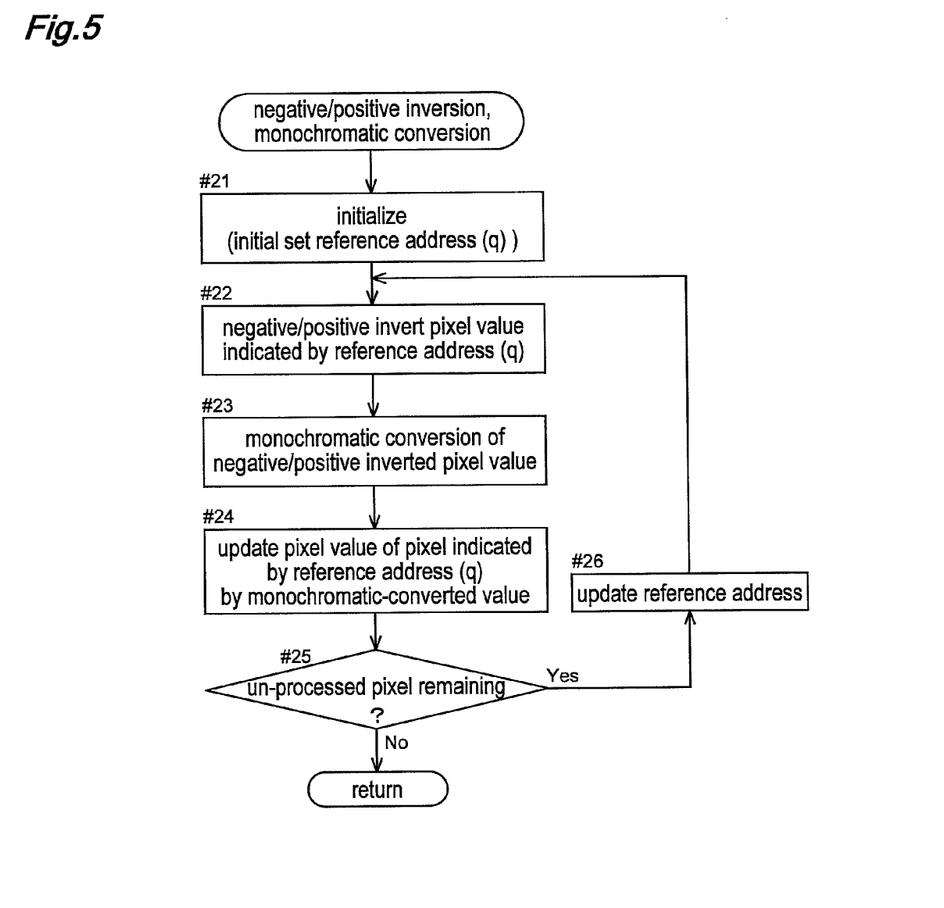
[FIG. 5] is a flowchart illustrating a flow of process of display image generation when an inversion condition is satisfied, in an embodiment of the inventive monitoring apparatus.

FIG. 5 is a flowchart illustrating the flow of process of effecting a negative/positive inversion and a monochromatic conversion on a captured image and generating a resultant display image. Firstly, as an initialization process, the initial address of the captured image in the RAM is set as the reference address (q) (#21). As described above, the captured image is a color image consisting of three planes of R, G, B, so the pixel value of the pixel (pi) is {Ri, Gi, Bi}. Further, each color component has a value within the range: [0, 255]. Accordingly, the pixel value of this pixel (pi) after the negative/positive inversion becomes {255-Ri, 255-Gi, 255-Bi} (#22).

Next, the display image generating unit 12 effects a monochromatic conversion on the negative/positive inverted pixel value to obtain a luminance value (Ii) (#23). Specifically, the unit 12 effects a calculation: Ii=0.299×(255-Ri)+0.587×(255-Gi)+0.114×(255-Bi).

Then, with using the luminance value (Ii) obtained as above, the pixel value of the pixel (pi) referenced by the reference address (q) is updated (#24). That is, the pixel value of the pixel (pi) becomes: {Ii, Ii, Ii}.

Thereafter, presence/absence of any unprocessed pixel(s) is checked (#25). Specifically, it is determined whether the reference address (q) has reached the final address of the captured image in the RAM or not. In the case of presence of un-processed pixel(s) (YES branching at #25), in order to shift the process to the next unprocessed pixel, the reference address (q) is incremented (#26) and then the process goes onto the process at #22, to repeat the above-described procedure. On the other hand, in the case of absence of un-processed pixel(s) (NO branching at #25), the generation process of display image is ended and the generated display image is sent to the displaying unit 13.

Upon receipt of the display image from the display image generating unit 12, the displaying unit 13 causes the display D to display the display image (#05).

Figure 6:
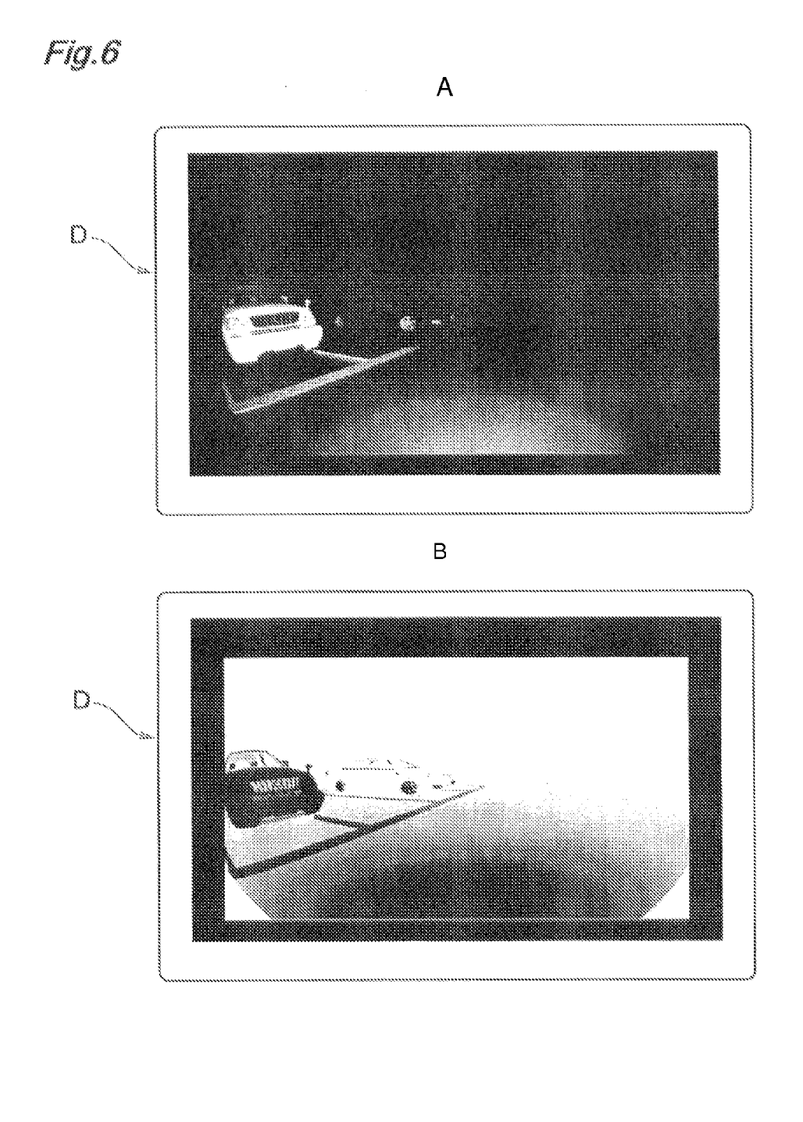
[FIG. 6] shows an example of captured image and an example of display image in the embodiment of the inventive monitoring apparatus.

FIG. 6A shows an example of a captured image of a dark area captured by the image capturing unit 10. If the above-described processes are effected on this captured image, the inversion condition determining unit 11 will determine that the inversion condition is satisfied, whereby a display image shown in FIG. 6B will be generated. As may be apparent from these figures, the dark area of the image in FIG. 6A appearing rather unclear previously has now become a clear image in FIG. 6B.

[Embodiment 2]

Figure 7:
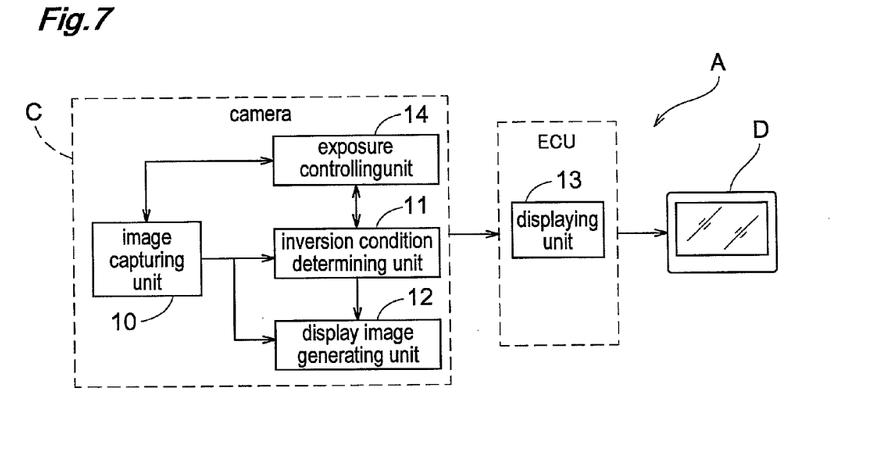
[FIG. 7] is a block diagram of Embodiment 2 and Embodiment 3 of the inventive monitoring apparatus.

Next, Embodiment 2 of the monitoring apparatus relating to the present invention will be described. FIG. 7 is a functional block diagram of this embodiment. Incidentally, the same functional units as those in Embodiment 1 are denoted with the same reference numerals, and detailed discussion thereof will be omitted. This embodiment differs from Embodiment 1 in that there is additionally provided an exposure controlling unit 14.

The exposure controlling unit 14 is constituted from the DSP of the camera C and this unit 14 has the function of calculating an appropriate gain value based on the captured image captured by the image capturing unit 10 and setting the calculated gain value to the image capturing unit 10, thereby to effect an exposure control of this image capturing unit 10. Further, the calculated grain value is reported also to the inversion condition determining unit 11.

Figure 8:
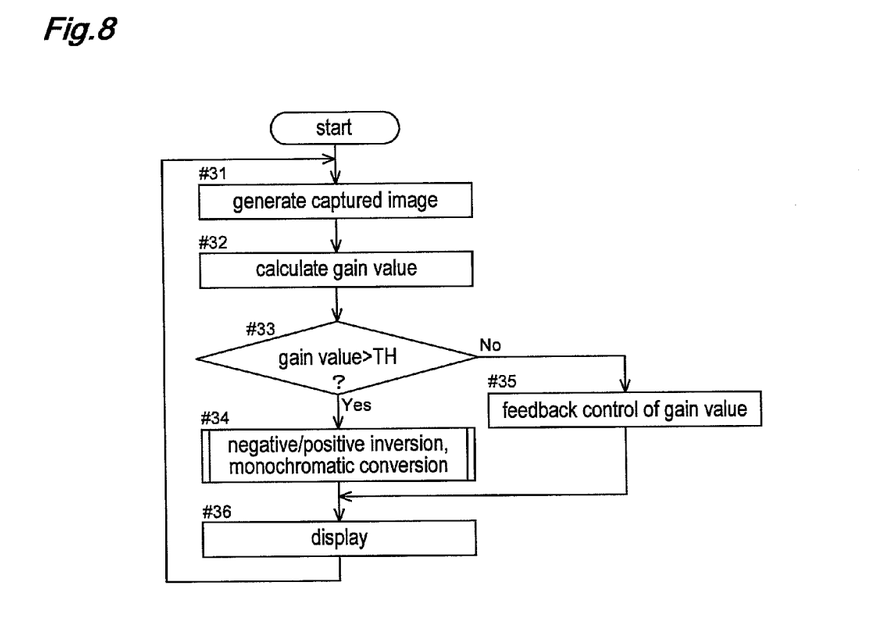
[FIG. 8] is a flowchart illustrating a flow of a process in Embodiment 2 of the inventive monitoring apparatus.

Next, with reference to the flowchart of FIG. 8, the flow of the process in this embodiment will be explained. Firstly, the image capturing unit 10 is driven at a predetermined frame rate to generate a captured image (#31). The generated captured image is stored in the RAM of the camera C and this event is reported to the inversion condition determining unit 11.

Upon receipt of the report of the event (occurrence) of capture image generation, the exposure controlling unit 14 calculates an appropriate gain value by a known method (#32). This calculated gain value is reported to the inversion condition determining unit 11.

The inversion condition determining unit 11 compares the obtained gain value with a predetermined threshold value TH (#33) and determines whether to effect a negative/positive inversion or not. In general, in the case of image capturing of a dark area, noise becomes more conspicuous with increase of the gain value. Therefore, preferably, this threshold value TH is set as a value slightly smaller than a gain value which results in making noise too conspicuous. With setting of such threshold value TH, with a gain value which is short for conspicuous noise showing, a captured image with the gain value adjustment will be generated, whereas, in a situation where a gain value which results in noise appearing conspicuous, that is, a gain value greater than the threshold value, needs to be set, the display image will be generated by effecting a positive/negative inversion and a monochromatic conversion on the captured image.

Therefore, in case the gain value is smaller than the threshold value TH (NO branching at #33), the inversion condition is not satisfied; hence, for improvement of image quality of the captured image by means of exposure control, the inversion condition determining section 11 issues an instruction to the exposure controlling unit 14 to feedback the gain value to the image capturing unit 10. In response thereto, the exposure controlling unit 14 feedbacks the calculated gain value to the image capturing unit 10 for changing the gain value for subsequent image capturing operations by the image capturing unit 10 (#35). Simultaneously, the inversion condition determining unit 11 reports the non-satisfaction of the inversion condition to the display image generating unit 12. In response thereto, the display image generating unit 12 displays the captured image as it is as a display image to the displaying unit 13.

On the other hand, in case the gain value is greater than the threshold value TH (YES branching at #33), the inversion condition is satisfied. Hence, this (i.e. satisfaction of the condition) is reported to the display image displaying unit 12. In response thereto, the display image generating unit 12 effects a negative/positive inversion and a monochromatic conversion on the captured image, thereby to generate a display image (#34). This generated display image is sent to the displaying unit 13. In this case, the gain control by the exposure controlling unit 14 is not effected for the image capturing unit 10. The gain value of the image capturing unit 10 is fixed at a predetermined value (at a gain value set immediately previously set by the exposure controlling unit 14 or a value smaller than it).

Upon receipt of the display image, the displaying unit 13 causes the display D to display this display image (#36).

Figure 9:
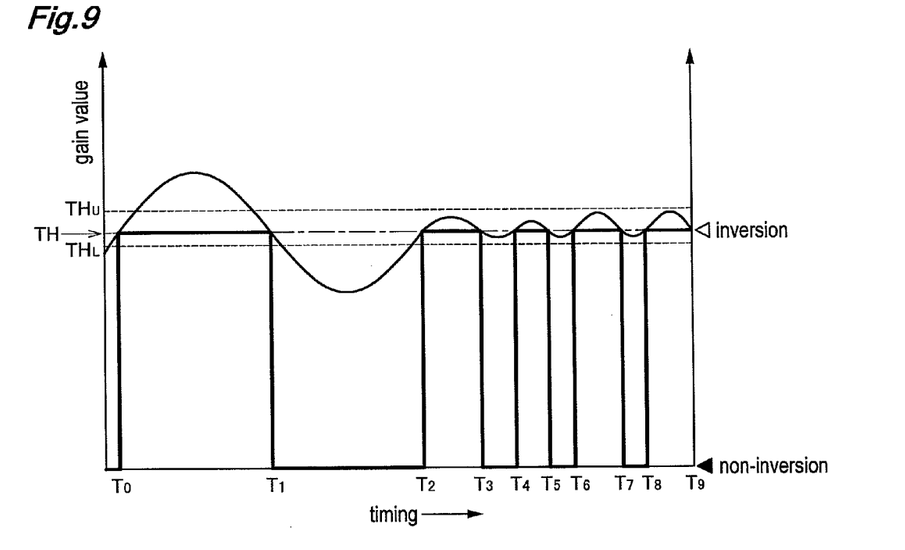
[FIG. 9] is a view showing relationship between gain values and the inversion condition satisfied states.

FIG. 9 is a view showing relationship between gain values and the inversion condition satisfied states. The horizontal axis in the figure represents the timings and the vertical axis represents the gain values calculated by the exposure controlling unit 14. Further, the bold line in the figure shows satisfaction/non-satisfaction of the inversion condition, that is, whether the negative/positive inversion is to be effected or not. As may be apparent from this figure, at timing $T_0$, the gain value is TH. So, at this timing, the inversion condition is satisfied. Thereafter until the timing $T_1$, the gain value calculated by the exposure controlling unit 14 maintains its condition of exceeding the threshold value TH. Therefore, the display image will be subject to a negative/positive inversion from the timing $T_0$ to $T_1$.

As may be apparent from the figure, after the timing $T_2$, the gain value fluctuates up/down across the threshold value TH at short intervals. In such case, a negative/positive inverted image and an image not negative/positive inverted will be displayed alternately (this will be referred to as "alternate display" hereinafter), thus deteriorating the visibility for the driver. In order to solve this inconvenience, preferably, the inversion condition determining unit 11 is configured to change the threshold value TH in case it is determined that the alternate display will occur. For instance, if the threshold value is set to $TH_L$, the gain values after the timing $T_2$ will become greater than $TH_L$, so the inversion condition will be satisfied continuously. Therefore, after the timing $T_2$, negative/positive images will be displayed and no alternate display will occur.

Further, the threshold value may be set to $TH_u$ greater than TH. In this case, the inversion condition is not satisfied after the timing $T_2$, so a non negative/positive inverted image will be displayed continuously.

[Embodiment 3]

Next, Embodiment 3 of the monitoring apparatus relating to the present invention will be explained. As the functional units of this embodiment are same as Embodiment 2, detailed discussion will be omitted and only differences will be discussed.

The exposure controlling unit 14 in this embodiment is constituted from the DSP of the camera C and this unit 14 has the function of calculating an appropriate shutter speed (i.e. the light accumulating period of the image sensor) based on the captured image captured by the image capturing unit 10 and setting the calculated shutter speed to the image capturing unit 10, thereby to effect an exposure control of this image capturing unit 10. Further, the calculated shutter speed is reported also to the inversion condition determining unit 11.

Figure 10:
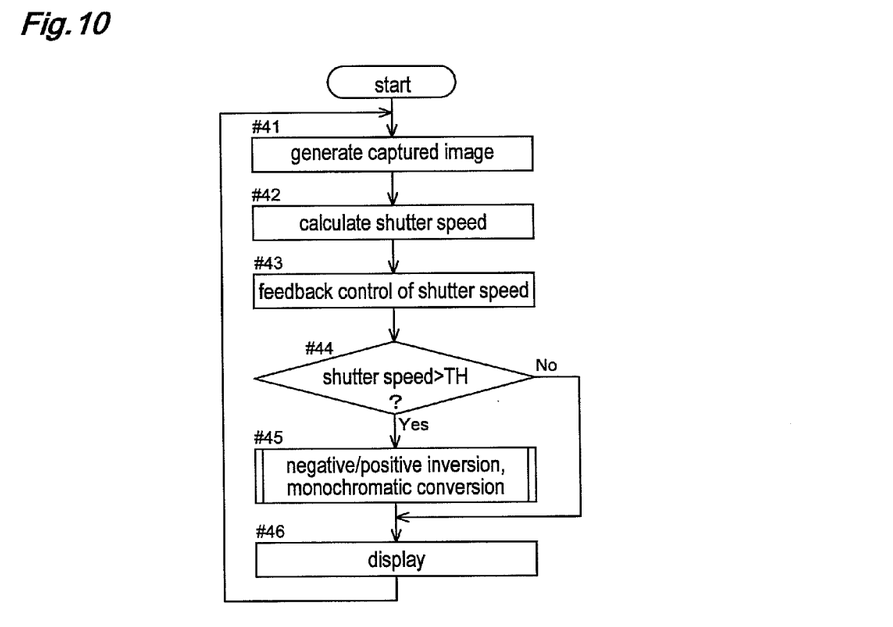
[FIG. 10] is a flowchart illustrating a flow of a process in Embodiment 3 of the inventive monitoring apparatus.

Next, with reference to the flowchart of FIG. 10, the flow of the process in this embodiment will be explained. Firstly, the image capturing unit 10 is driven at a predetermined frame rate to generate a captured image (#41). And, the generated captured image is stored in the RAM of the camera C and this event is reported to the inversion condition determining unit 11.

Upon receipt of the report of the event of capture image generation, the exposure controlling unit 14 calculates an appropriate shutter speed by a known method (#42). This calculated shutter speed is reported to the inversion condition determining unit 11. Simultaneously, for effecting exposure control of the exposure controlling unit 14, the shutter speed calculated is fed back to the exposure controlling unit 10 (#43). Upon reception thereof, the image capturing unit 10 changes the shutter speed for subsequent use.

The inversion condition determining unit 11 compares the obtained shutter speed with a predetermined threshold value TH (#44) and determines whether to effect a negative/positive inversion on the captured image or not. In case the shutter speed is greater than the threshold value TH (YES branching at #43), the inversion condition is satisfied. Hence, this (i.e. satisfaction of the condition) is reported to the display image displaying unit 12. In response thereto, the display image generating unit 12 effects a negative/positive inversion and a monochromatic conversion on the captured image, thereby to generate a display image (#45). This generated display image is sent to the displaying unit 13.

On the other hand, if the shutter speed is smaller than the threshold value TH (NO branching at #43), this (i.e. non-satisfaction of the condition) is reported to the display image generating unit 12. In response thereto, the display image generating unit 12 sends the captured image as it is as the display image to the displaying unit 13.

Upon receipt of the display image, the displaying unit 13 causes the display D to display this display image (#46).

[Other Embodiments]

(1) In the foregoing embodiment, in generating a display image, a negative/positive inversion and a monochromatic conversion are effected at together. Instead, a negative/positive inversion may be effected after a monochromatic conversion.

(2) In the foregoing embodiment, in effecting a negative/positive inversion, this inversion is effected with using the entire domain of definition of pixel values. Instead, the inversion may be effected with using only a portion of the domain of definition of pixel values. That is, the pixel value after the inversion may be provided with an "offset". For instance, a pixel (p) of domain of definition [0, 255] will be negative/positive inverted by: 255−p+offset. In this, if the "offset" is positive, the negative/positive inverted pixel value will be shifted toward the high luminance side, so luminance values on the low luminance side will not be used. On the other hand, if the offset is negative, the negative/positive inverted pixel value will be shifted toward the low luminance side, so luminance values on the high luminance side will not be used. Incidentally, in either case, any pixel value exceeding the domain of definition will be rounded to the maximum or minimum value.

The value of this offset can be appropriately set according to the environment where the apparatus is used. For instance, if the captured image is very dark, a negative/positive inversion thereof results in the image being very bright. For this reason, in order to avoid so-called blown-out highlights, a negative offset should be set. Further, if an LCD (liquid crystal display) is used as the display D, low luminance may not be expressed satisfactorily due to the characteristics of LCD. In such case, preferably, a positive offset should be set so that the pixel values after the negative/positive inversion may remain within a luminance range that can be expressed by the LCD.

Further, in accordance with the dynamic range characteristics of the display D, compression or expansion of the dynamic range of the pixel values after the negative/positive inversion may be effected.

(3) In the foregoing embodiment, the entire captured image is subject to a negative/positive inversion. However, only a portion of the captured image may be subject to a negative/positive inversion. For instance, if the camera C is mounted to be capable of capturing an image of the front side of the vehicle V and has a wide view angle, the image captured thereby will contain a portion which is affected by the illumination of the headlight L of the vehicle V (this will be referred to as "a high luminance area" hereinafter) and a portion which is hardly affected thereby in a mixed state (this will be referred to as "a low luminance area" hereinafter). In such case, if the captured image entirely is subject to a negative/positive inversion, the pixel values in the high luminance area will be changed to low luminance, thus resulting in a display image poorly visible for the driver. In such case, a pixel value in the high luminance area is not subject to a negative/positive inversion and a pixel value in the low luminance area alone is subject to a negative/positive inversion. Incidentally, the determination (distinction) between the high luminance area and the low luminance area could be realized by means of an image processing, but as these areas are regulated by the positional relationship between the headlight L and the camera C, these respective areas can be set in advance also. Further, in such case, the captured image contains also in a mixed state, the non-processed color area and the negative/positive inverted monochromatic area, it is preferred for the greater visibility for the driver that a boundary therebetween be displayed clearly.

(4) In the foregoing embodiment, the respective functional sections or units of the monitoring apparatus A are constituted from the DSP of the camera C and the ECU mounted on the vehicle V. However, the invention is not limited thereto. For instance, it is also possible to constitute them from the ECU alone. Or, a CPU (Central Processing Unit) may be provided separately so that the units may be constituted from this CPU and a program.

INDUSTRIAL APPLICABILITY

The present invention may be applied to a monitoring apparatus for effecting monitoring by displaying a low luminance image captured from e.g. a dark area.

DESCRIPTION OF REFERENCE MARKS

A: monitoring apparatus
V: vehicle

10: image capturing unit
11: inversion condition determining unit
12: display image generating unit
13: displaying unit
14: exposure controlling unit

The invention claimed is:

1. A monitoring apparatus comprising:
an image capturing unit for capturing an image of an object to be monitored;
an inversion condition determining unit for determining whether an inversion condition is satisfied or not, based on the visibility of the image captured by the image capturing unit;
a display image generating unit for generating a negative/positive inverted image from the captured image when it is determined by the inversion condition determining unit that the inversion condition is satisfied;
an exposure controlling unit for effecting exposure control of the image capturing unit by controlling a gain value or a shutter speed of the image capturing unit; and
said inversion condition determining unit determining the inversion condition based on the gain value when the exposure controlling unit controls the gain value, said inversion condition determining unit determining the inversion condition based on the shutter speed when the exposure controlling unit controls the shutter speed.

2. The monitoring apparatus according to claim 1, wherein said inversion condition determining unit determines that the inversion condition is satisfied if said gain value exceeds a predetermined gain value which is smaller than a maximum gain value thereof.

3. The monitoring apparatus according to claim 1, wherein said display image generating unit offsets the pixel value in effecting the negative/positive inversion.

4. The monitoring apparatus according to claim 1, wherein said display image generating unit effects the negative/positive inversion on a portion of the captured image.

5. A monitoring apparatus according to claim 1 mounted on a vehicle, wherein said image capturing unit is disposed to capture an image of the surrounding of the vehicle.

6. A monitoring apparatus according to claim 5, wherein said image capturing unit is disposed to capture an image of lateral vicinity of the vehicle.

7. A monitoring apparatus according to claim 1, wherein said image capturing unit captures the captured image as a color image; and
said display image generating unit generates, as said negative/positive inverted image, a grayscale image produced by effecting the negative/positive inversion and a monochromatic conversion on said captured image.

8. The monitoring apparatus according to claim 1, wherein the inversion condition determining unit determines that the inversion condition is satisfied in a case where the shutter speed is greater than a predetermined speed.

9. The monitoring apparatus according to claim 1, wherein the shutter speed is a light accumulating period of an image sensor.

* * * * *